US012138762B1

(12) United States Patent
Neill

(10) Patent No.: US 12,138,762 B1
(45) Date of Patent: Nov. 12, 2024

(54) LOCK JAW TOOL DEVICE

(71) Applicant: Joseph C. Neill, Coos Bay, OR (US)

(72) Inventor: Joseph C. Neill, Coos Bay, OR (US)

(*) Notice: Subject to any disclaimer, the term of this patent is extended or adjusted under 35 U.S.C. 154(b) by 0 days.

(21) Appl. No.: 18/634,046

(22) Filed: Apr. 12, 2024

(51) Int. Cl.
*B25B 7/16* (2006.01)

(52) U.S. Cl.
CPC .................................... *B25B 7/16* (2013.01)

(58) Field of Classification Search
CPC ................ B25B 7/12; B25B 7/14; B25B 7/16
USPC ........................................................ 81/318
See application file for complete search history.

(56) References Cited

U.S. PATENT DOCUMENTS 1,540,745 A * 6/1925 Bain ........................ B25B 7/02 81/335
2,409,627 A * 10/1946 Helgeson .................. B25B 7/10 81/335
2,454,309 A * 11/1948 Davis ........................ B25B 7/18 269/211
4,554,848 A * 11/1985 Galletto .................... B25B 7/12 81/395

OTHER PUBLICATIONS

Website available at least as early as Mar. 28, 2024 at: https://www.woodsmithplans.com/plan/bench-vise/.

* cited by examiner

*Primary Examiner* — Tom Rodgers
(74) *Attorney, Agent, or Firm* — PATENTFILE, LLC; Bradley C. Fach; Steven R. Kick

(57) ABSTRACT

A lock jaw tool device may include a first beam and a second beam that may be movably coupled together in preferably two or more locations on each beam. A first jaw may be coupled to the first beam, and a second jaw may be coupled to the second beam. One or more adjustable couplings may couple the beams together and may govern the positioning of the beams relative to each other. By changing the positioning of the beams relative to each other, the positioning of the jaws relative to each other may also be changed. The one or more adjustable couplings enables the formation of fulcrums for the purpose of generating pressure on a multitude of different types of jaws. Through independent control of the one or more adjustable couplings the jaws of the beams can firmly grip or otherwise manipulate material at varying angles.

8 Claims, 4 Drawing Sheets

LOCK JAW TOOL DEVICE

FIELD OF THE INVENTION

This patent specification relates to the field of material manipulation tools. More specifically, this patent specification relates to a tool device having locking jaws that can be used for many types of material manipulation uses.

BACKGROUND

Many people use "Vise Grips" and other locking pliers which can lock and have lots of gripping power. Unfortunately, many users of these locking pliers have many injuries and scars that they have received while using the locking pliers. Often, a user will stress them to their limits and when the user releases them, they open with such force they can hurt the user.

Prior art includes the hand screw wood clamp which has some similarities to the lock jaw tool device. Both tools have two beams that are connected with screws that swivel.

The hand screw wood clamp is limited in the forces that can be generated by the twisting grip strength on the wooden handles.

Typically the hand screw wood clamp has soft wooden jaws to prevent marring of clamped wood. These are designed to squeeze and gently hold between internal jaws but are not designed with external and removable jaws to expand and hold inside a constrained area.

One of the many differences is the lock jaw tool device has interchangeable jaws that can vary from wedged, narrow, wide, or curved for cutting, crushing, bending, crimping, prying, and lifting.

While some wooden vises exist, typically having two Acme screws, the lower screw is not for increasing the pressure exerted by the vice with a screw and handle, but for keeping the jaws parallel. Typically, these vises have a lower wood hand nut on the Acme screw that is only suitable to keep the jaws parallel.

Also, the additional leverage generated with a lock jaw tool device having a folding or ratcheting handle greatly increases the forces being created to permit functions such as cutting, crushing, metal forming and crimping not possible with a hand screw wood clamp.

Therefore, a need exists for novel material manipulation tools. A further need exists for novel material manipulation tools having locking jaws that can be used for many types of material manipulation uses and which are not prone to injuring their users.

BRIEF SUMMARY OF THE INVENTION

New lock jaw tool devices are provided which may be used as material manipulation tools having locking jaws that can be used for many types of material manipulation uses and which are not prone to injuring their users. Preferably, a lock jaw tool device may include a first beam and a second beam that may be movably coupled together in preferably two or more locations on each beam. A first jaw may be coupled to the first beam, and a second jaw may be coupled to the second beam. One or more adjustable couplings may couple the beams together and may govern the positioning of the beams relative to each other. By changing the positioning of the beams relative to each other, the positioning of the jaws relative to each other may also be changed. The one or more adjustable couplings enables the formation of fulcrums for the purpose of generating pressure on a multitude of different types of jaws. Through independent control of the one or more adjustable couplings the jaws of the beams can firmly grip or otherwise manipulate material at varying angles. Different types of jaws may be coupled to the beams which may possess functions, such as the capability of gripping, bending, or cutting objects internally or externally.

In some embodiments, a lock jaw tool device may have a first beam having a first end and a second end, and a second beam also having a first end and a second end. A first adjustable coupling may couple the first beam and the second beam together proximate to the first end of the first beam and proximate to the first end of the second beam. A second adjustable coupling may couple the first beam and the second beam together proximate to the second end of the first beam and proximate to the second end of the second beam. A first jaw may be coupled to the first end of the first beam, and a second jaw may be coupled to the first end of the second beam. Rotating the first adjustable coupling in a first direction, such as clockwise, causes the first beam and the second beam to be moved relative to each other causing the first jaw and the second jaw to be moved towards each other. Rotating the first adjustable coupling in a second direction, the second direction opposite to the first direction, such as anti-clockwise, causes the first beam and the second beam to be moved relative to each other causing the first jaw and the second jaw to be moved away from each other. Rotating the second adjustable coupling in the first direction causes the first beam and the second beam to be moved relative to each other causing the first jaw and the second jaw to be moved away from each other. Rotating the second adjustable coupling in the second direction causes the first beam and the second beam to be moved relative to each other causing the first jaw and the second jaw to be moved towards each other.

In some embodiments, a lock jaw tool device may have a first beam having a first end and a second end, and a second beam also having a first end and a second end. A beam pivot may movably couple the first beam and the second beam together so that the first beam and the second beam are able to pivot relative to each other. The beam pivot may be coupled to the first beam between the first end of the first beam and between the second end of the first beam, and the beam pivot may be coupled to the second beam between the first end of the second beam and between the second end of the second beam. An adjustable coupling may be coupled to the first beam proximate to the second end of the first beam. A coupling fastener may movably couple the first beam to the adjustable coupling so that the adjustable coupling is able to pivot relative to the first beam. A beam coupler may be movably coupled to the adjustable coupling so that the beam coupler is able to be moved towards and away from the second end of the first beam, and the beam coupler may be configured to be removably coupled to the second end of the second beam. A first jaw may be coupled to the first end of the first beam, and a second jaw may be coupled to the first end of the second beam. Rotating the adjustable coupling in a first direction causes the beam coupler to move towards the second end of the first beam and causes the second end of the second beam to move towards the second end of the first beam when the beam coupler is coupled to the second end of the second beam resulting in the first jaw and the second jaw being moved towards each other. Rotating the adjustable coupling in a second direction, the second direction opposite to the first direction, causes the beam coupler to move away from the second end of the first beam and causes the second end of the second beam to move away from the second end of the first beam when the beam coupler is coupled to the second end of the second beam resulting in the first jaw and the second jaw being moved away from each other.

In some embodiments, a lock jaw tool device may have a first beam having a first end and a second end, and a second beam also having a first end and a second end. A base may be coupled to the second end of the second beam, and the base may have a planar mounting surface and a mounting aperture extending through the planar mounting surface. A first adjustable coupling may couple the first beam and the second beam together proximate to the first end of the first beam and proximate to the first end of the second beam. A second adjustable coupling may couple the first beam and the second beam together proximate to the second end of the first beam and proximate to the second end of the second beam. A first jaw may be coupled to the first end of the first beam, and a second jaw may be coupled to the first end of the second beam. Rotating the first adjustable coupling in a first direction causes the first beam and the second beam to be moved relative to each other causing the first jaw and the second jaw to be moved towards each other. Rotating the first adjustable coupling in a second direction, the second direction opposite to the first direction, causes the first beam and the second beam to be moved relative to each other causing the first jaw and the second jaw to be moved away from each other. Rotating the second adjustable coupling in the first direction causes the first beam and the second beam to be moved relative to each other causing the first jaw and the second jaw to be moved away from each other. Rotating the second adjustable coupling in the second direction causes the first beam and the second beam to be moved relative to each other causing the first jaw and the second jaw to be moved towards each other.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
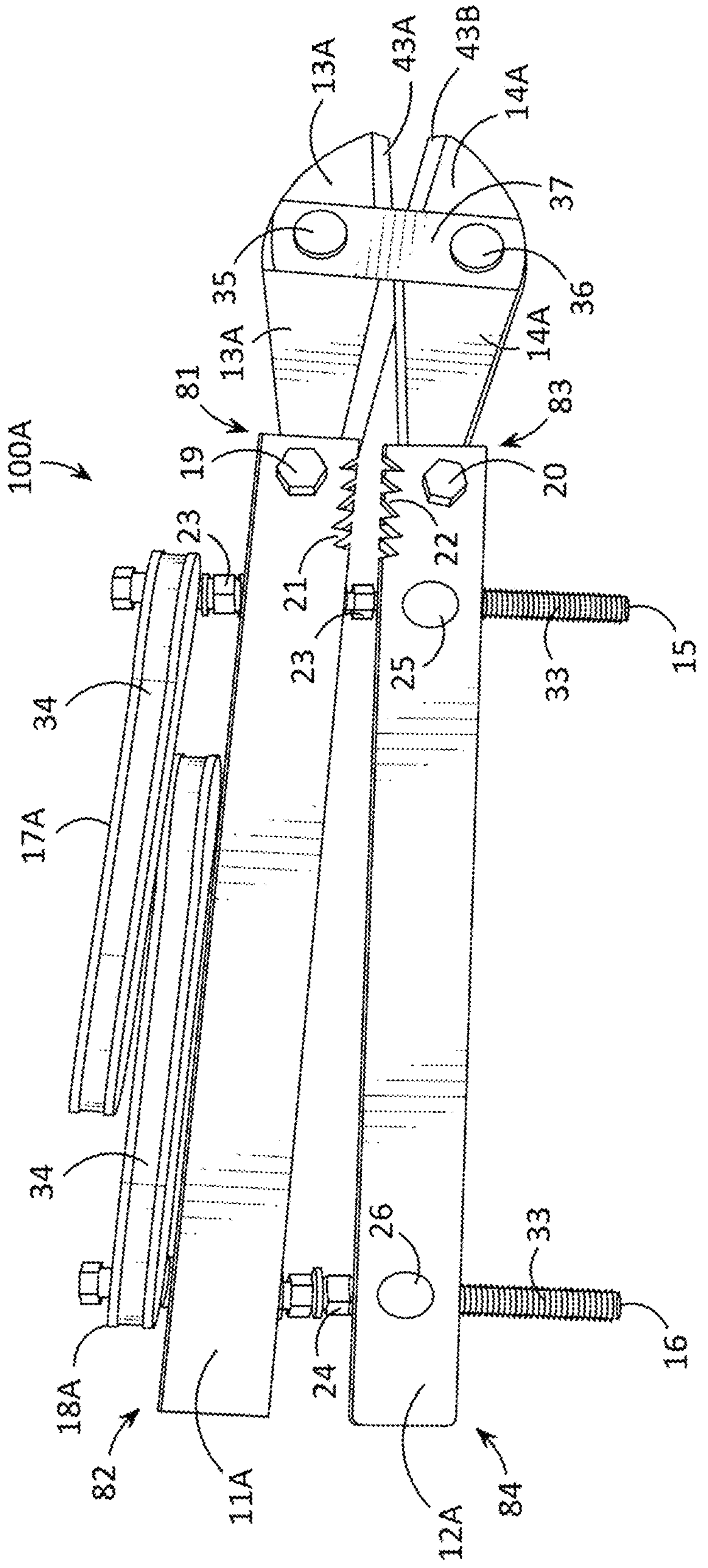
FIG. 1—FIG. 1 depicts a perspective view of a first example of a lock jaw tool device according to various embodiments described herein.

For purposes of description herein, the terms "upper," "lower," "left," "right," "rear," "front," "side," "vertical," "horizontal," and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first," "second," etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 20% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

A new lock jaw tool device is discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

The present invention will now be described by example and through referencing the appended figures representing preferred and alternative embodiments. FIGS. 1-4 illustrate examples of a lock jaw tool device ("the device") 100A, 100B, 100C, according to various embodiments. In some embodiments, the device 100A, 100B, 100C, may include a first beam 11A, 11B, 11C, and a second beam 12A, 12B, 12C, that may be movably coupled together in preferably two or more locations on each beam 11A, 11B, 11C, 12A, 12B, 12C. A first jaw 13A, 13B, 13C, may be coupled to the first beam 11A, 11B, 11C, and a second jaw 14A, 14B, 14C, may be coupled to the second beam 12A, 12B, 12C. One or more adjustable couplings 15, 16, may couple the beams 11A, 11B, 11C, 12A, 12B, 12C, together and may govern the positioning of the beams 11A, 11B, 11C, 12A, 12B, 12C, relative to each other. By changing the positioning of the beams 11A, 11B, 11C, 12A, 12B, 12C, relative to each other, the positioning of the jaws 13A, 13B, 13C, 14A, 14B, 14C, relative to each other may also be changed. The one or more adjustable couplings 15, 16, enables the formation of fulcrums for the purpose of generating pressure on a multitude of different types of jaws 13A, 13B, 13C, 14A, 14B, 14C. Through independent control of the one or more adjustable couplings 15, 16, the jaws 13A, 13B, 13C, 14A, 14B, 14C, of the beams 11A, 11B, 11C, 12A, 12B, 12C, can firmly grip or otherwise manipulate material at varying angles. Different types of jaws 13A, 13B, 13C, 14A, 14B, 14C, may be coupled to the beams 11A, 11B, 11C, 12A, 12B, 12C, which may possess functions, such as the capability of gripping, bending, or cutting objects internally or externally.

The preferably interchangeable jaws 13A, 13B, 13C, 14A, 14B, 14C, provide a gripping force significantly surpassing that of any hand tool. In preferred embodiments, the adjustable couplings 15, 16, may comprise threaded bolts which offers a superior mechanical advantage compared to a basic fulcrum tool, where the force exerted is determined by the ratio of handle movement to jaw movement. For example, a set of lineman pliers with 6 inch handles has a mechanical advantage of 6 to 1. While a bolt type of adjustable coupling 15, 16, with 16 threads per inch on the same 6 inch handle with a ratchet 34 can generate hundreds of times more force.

While certain tools employ compound levers, the device 100A, 100B, 100C, modifies the fulcrums provided by one or more adjustable couplings 15, 16, to multiply the force that the jaws 13A, 13B, 13C, 14A, 14B, 14C, are able to exert on an object that is positioned between the jaws 13A, 13B, 13C, 14A, 14B, 14C. As an illustration and for example, upon tightening a first adjustable coupling 15 (e.g., a bolt) with a ratchet type of first adjustable coupling motivator 17 that is to close the jaws 13A, 13B, 13C, 14A, 14B, 14C, the screw force of the first adjustable coupling 15 has the potential to produce a substantial amount of pressure through the jaws 13A, 13B, 13C, 14A, 14B, 14C. Subsequently, when a second adjustable coupling 16 (e.g., a bolt) is unscrewed with a ratchet 34 type of second adjustable coupling motivator 18, the distance between the fulcrum of the first adjustable coupling 15 and the fulcrum of the second adjustable coupling 16 amplifies the force generated by the screw threads 33 of the second adjustable coupling 16 by the ratio of the distance of the clamped object from the primary fulcrum or first adjustable coupling 15 to the second fulcrum or second adjustable coupling 16.

Turning now to FIG. 1, a first example of a lock jaw tool device 100A is illustrated. In this and in some embodiments, the device 100A may comprise a first beam 11A and a second beam 12A that may be movably coupled together in two locations on each beam 11A, 12A, via a first adjustable coupling 15 and a second adjustable coupling 16. A first jaw 13A may be coupled to the first beam 11A, and a second jaw 14A may be coupled to the second beam 12A. The adjustable couplings 15, 16, may couple the beams 11A, 12A, together and may govern the positioning of the beams 11A, 12A, and therefore the jaws 13A, 14A, relative to each other.

In preferred embodiments, the device 100A may comprise a first beam 11A having a first end 81 and a second end 82, and a second beam 12A having a first end 83 and a second end 84. A first adjustable coupling 15 may couple the first beam 11A and the second beam 12A together proximate to the first end 81 of the first beam 11A and proximate to the first end 83 of the second beam 12A. A second adjustable coupling 16 may couple the first beam 11A and the second beam 12A together proximate to the second end 82 of the first beam 11A and proximate to the second end 84 of the second beam 12A. A first jaw 13A may be coupled to the first end 81 of the first beam 11A, and a second jaw 14A may be coupled to the first end 83 of the second beam 12A. Rotating the first adjustable coupling 15 in a first direction, such as clockwise, may cause the first beam 11A and the second beam 12A to be moved relative to each other causing the first jaw 13A and the second jaw 14A to be moved towards each other. Rotating the first adjustable coupling 15 in a second direction, the second direction opposite to the first direction, such as anti-clockwise, may cause the first beam 11A and the second beam 12A to be moved relative to each other causing the first jaw 13A and the second jaw 14A to be moved away from each other. Rotating the second adjustable coupling 16 in the first direction may cause the first beam 11A and the second beam 12A to be moved relative to each other causing the first jaw 13A and the second jaw 14A to be moved away from each other. Rotating the second adjustable coupling 16 in the second direction causes the first beam 11A and the second beam 12A to be moved relative to each other causing the first jaw 13A and the second jaw 14A to be moved towards each other. By changing the positioning of the beams 11A, 12A, relative to each other, the positioning of the jaws 13A, 14A, relative to each other may also be changed.

In preferred embodiments, the beams 11A, 12A, may be elongated in shape. Optionally, the beams 11A, 12A, may be generally linear in shape. The first beam 11A may comprise a first end 81 and an opposing second end 82, and the second beam 12A may also comprise a first end 83 and an opposing second end 84. Preferably, the beams 11A, 11B, may be elongated so that the distance between the first ends 81, 83, and second ends 82, 84, may form the largest dimensions of the beams 11A, 12A. The beams 11A, 12A, may be made from or may comprise aluminum, steel, other metals and metal alloys, or any other substantially rigid material. Optionally, the beams 11A, 12A, may be configured with an elongated rectangular prism shape, but it should be understood that the beams 11A, 12A, may be configured in any shape and size.

The device 100A may comprise one or more adjustable couplings, such as a first adjustable coupling 15 and a second adjustable coupling 16. In preferred embodiments, adjustable couplings 15, 16, may comprise threaded rods, threaded bolts, screws, or other threaded fastener or threaded coupling method having threading 33.

Preferably, the device 100A may comprise one or more pivotal couplings 25, 26, which may be used to movably and pivotally couple an adjustable coupling 15, 16, to a beam 11A, 12A. In some embodiments, a pivotal coupling 25, 26, may comprise threading to engage with threading 33 of an adjustable coupling 15, 16, and the pivotal coupling 25, 26, may be movably coupled to a beam 11A, 12A, so that the pivotal coupling 25, 26, may pivot relative to the beam 11A, 12A, to prevent the adjustable coupling 15, 16, from being bent as the beams 11A, 12A, are moved to different positions relative to each other and to the adjustable couplings 15, 16. As an example, a pivotal coupling 25, 26, may comprise a barrel nut (also known as steel cross dowel or dowel nut). A barrel nut is typically a round slug, or formed sheet metal part with threads perpendicular to the length of the nut. A pivotal coupling 25, 26, that comprises a barrel nut sits in a hole inside a beam 11A, 12A, that the pivotal coupling 25, 26, may pivot in, and a standard bolt or other adjustable coupling 15, 16, is threaded into the barrel nut from outside the beam 11A, 12A. In other embodiments, a pivotal coupling 25, 26, may comprise any other fastener or coupling method that may be movably and pivotally coupled to a beam 11A, 12A, and that may be movably and rotatably coupled to an adjustable coupling 15, 16.

In preferred embodiments, each adjustable coupling 15, 16, may be coupled to a beam 11A, 12A, via a pivotal coupling 25, 26, for example, the device 100A may have four pivotal couplings 25, 26. In further preferred embodiments, the device 100A may have a first pivotal coupling 25, and the first pivotal coupling 25 may movably couple the second beam 12A to the first adjustable coupling 15 so that the second beam 12A is able to pivot relative to the first adjustable coupling 15. In further preferred embodiments, the device 100A may have a second pivotal coupling 26, and the second pivotal coupling 26 may movably couple the second beam 12A to the second adjustable coupling 16 so that the second beam 12A is able to pivot relative to the second adjustable coupling 16.

In some embodiments, a first adjustable coupling motivator 17A may be coupled to the first adjustable coupling 15 and a second adjustable coupling motivator 18A may be coupled to the second adjustable coupling 15. In preferred embodiments, an adjustable coupling motivator 17A, 18A, may comprise a ratchet 34. A ratchet 34 is a mechanical device that allows continuous linear or rotary motion in only one direction while preventing motion in the opposite direction. For example, a ratchet 34 may comprise a device having a bar or wheel with a set of angled teeth in which a cog or tooth engages, allowing motion in one direction at a time only. Other example adjustable couplings 17A, 18A, include a handle, electric motors having independent controls, and a socket that may be coupled to a drill or other rotary tool. Preferably, by moving or rotating the adjustable coupling motivators 17A, 18A, the adjustable couplings 15, 16, may likewise be moved or rotated which in turn causes the beams 11A, 12A, to be moved relative to each other. For example, rotating a first adjustable coupling motivator 17A in a first direction may result in the first ends 81, 83, of the beams 11A, 12A, that are proximate to the jaws 13A, 14A, to be moved closer together, while rotating the first adjustable coupling motivator 17A in a second direction, the second direction opposite to the first direction, may result in first ends 81, 83, of the beams 11A, 12A, that are proximate to the jaws 13A, 14A, to be moved farther apart.

The adjustable couplings 15, 16, enables the formation of two fulcrums for the purpose of generating pressure on a multitude of different types of jaws 13A, 14A. Through independent control of each adjustable coupling 15, 16, the jaws 13A, 14A, of the beams 11A, 12A, can firmly grip or otherwise manipulate material at varying angles.

Figure 2:
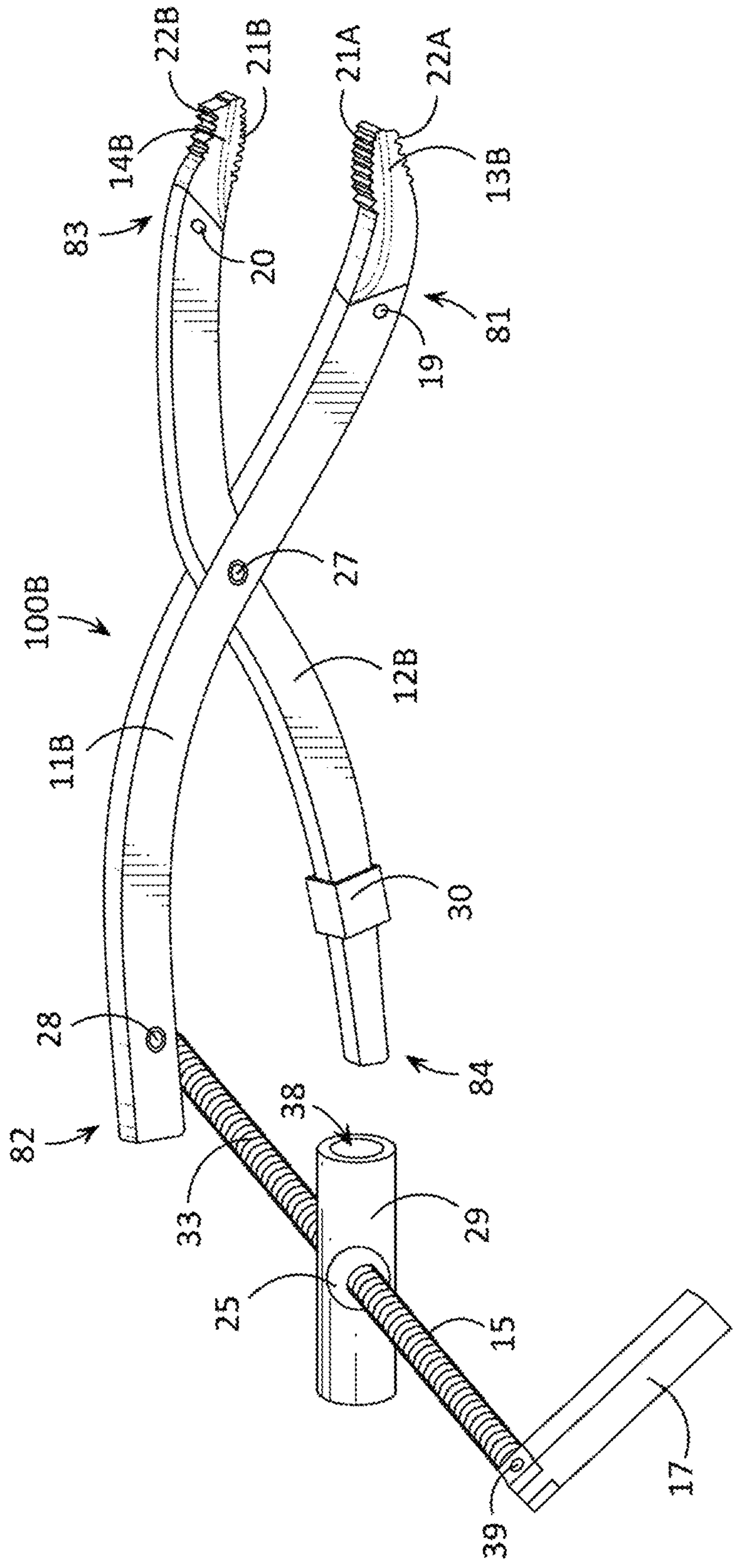
FIG. 2—FIG. 2 illustrates a perspective view of a second example of a lock jaw tool device according to various embodiments described herein.
Figure 3:
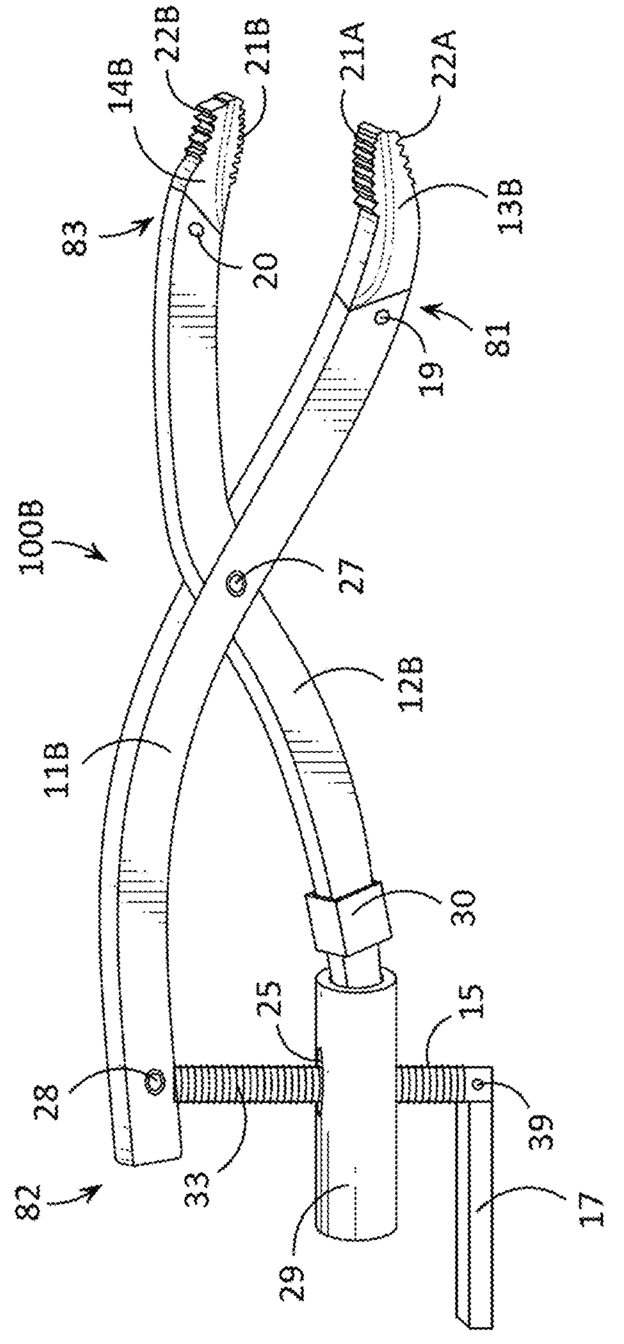
FIG. 3—FIG. 3 shows another perspective view of a second example of a lock jaw tool device according to various embodiments described herein.

In preferred embodiments, the device 100A may comprise a plurality of different types of jaws 13A, 14A, which may be removably and interchangeably coupled to the first ends 81, 83, of beams 11A, 12A. In some embodiments, the device 100A may comprise a first jaw 13A and a second jaw 14A that may be movably coupled together, such as via a jaw coupler 37 that may be movably coupled to each jaw 13A, 14A, via a jaw coupling fastener 35, 36. For example, a jaw coupler 37 may comprise a metal plate and jaw coupling fasteners 35, 36, may comprise pivot pins, rivets, threaded fasteners, or any other device or coupling method. Different types of jaws 13A, 14A, may come in various forms, including needle nose, straight, curved, padded, cutting, gripping, and bending. Depending on the type of jaws 13A, 14A, coupled to the beams 11A, 12A, the device 100A may possess different types of functions, such as the capability of gripping (such as the jaws 13B, 14B, having grip texturing 21, 22, as shown in FIGS. 2 and 3), bending, or cutting objects (such as via the jaws 13A, 14A, having cutting edges 43A, 43B, as shown in FIG. 1) internally or externally. Jaws 13A, 14A, may be removably coupled to a beam 11A, 12A, via one or more jaw fasteners 19, 20, such as bolts, screws, and other threaded fasteners, by being threadedly coupled to the beams 11A, 12A, or via any other removable coupling method or device.

Optionally, one or more beams 11A, 12A, may comprise grip texturing 21, 22, such as ridges or teeth, cutouts or depressions, etc., which may facilitate the ability of the device 100A to grip an object between the grip texturing 21, 22. Optionally, the device 100A may comprise one or more adjustment fasteners 23, 24, which may be coupled to an adjustable coupling 15, 16, and which may be used to lock or maintain the positioning of the beams 11A, 12A, relative to each other. For example, adjustment fasteners 23, 24, may comprise nuts or other threaded fasteners which may be positioned at various positions on an adjustable coupling 15, 16, and which may be used to lock or maintain the positioning of the beams 11A, 12A, relative to each other. Preferably, the function of adjustment fasteners 23, 24, may be to keep the adjustable coupling 15, 16, in and coupled to a beam 11A, 12A, while still allowing the adjustable coupling 15, 16, to rotate. Preferably, a stopper may be used instead of an adjustable coupling 15, 16, when using removable cutting type jaws 13A, 14A, to force the beams 11A, 12A, apart. Instead of a nut type adjustable coupling 15, 16, a stopper may be a welded pipe, block, washer, or other substantially rigid object.

Turning now to FIGS. 2 and 3, a second example of a device 100B is illustrated. In this and in some embodiments, the device 100B may comprise a first beam 11B and a second beam 12B that may be movably coupled together in two locations on each beam 11B, 12B, via a beam pivot 27 and a first adjustable coupling 15. A first jaw 13B may be coupled to a first end 81 of the first beam 11B, and a second jaw 14B may be coupled to the first end 83 of the second beam 12B. The beam pivot 27 and first adjustable coupling 15 may couple the beams 11B, 12B, together and may govern the positioning of the beams 11B, 12B, relative to each other.

In preferred embodiments, the device 100B may have a first beam 11B having a first end 81 and a second end 82, and a second beam 12B also having a first end 83 and a second end 84. A beam pivot 27 may movably couple the first beam 11B and the second 12B beam together so that the first beam 11B and the second beam 12B are able to pivot relative to each other. The beam pivot 27 may be coupled to the first beam 11B between the first end 81 of the first beam 11B and between the second end 82 of the first beam 11B, and the beam pivot 27 may be coupled to the second beam 12B between the first end 83 of the second beam 12B and between the second end 84 of the second beam 12B. An adjustable coupling 15 may be coupled to the first beam 11B proximate to the second end 82 of the first beam 11B. A coupling fastener 28 may movably couple the first beam 11B to the adjustable coupling 15 so that the adjustable coupling 15 is able to pivot relative to the first beam 11B. A beam coupler 29 may be movably coupled to the adjustable coupling 15 so that the beam coupler 29 is able to be moved towards and away from the second end 82 of the first beam 11B, and the beam coupler 29 may be configured to be removably coupled to or engaged to the second end 84 of the second beam 12B. A first jaw 13B may be coupled to the first end 81 of the first beam 11B, and a second jaw 14B may be coupled to the first end 83 of the second beam 12B. Rotating the adjustable coupling 15 in a first direction causes the beam coupler 29 to move towards the second end 82 of the first beam 11B and causes the second end 84 of the second beam 12B to move towards the second end 82 of the first beam 11B when the beam coupler 29 is coupled to the second end 84 of the second beam 12B resulting in the first jaw 13B and the second jaw 14B being moved towards each other. Rotating the adjustable coupling 15 in a second direction, the second direction opposite to the first direction, causes the beam coupler 29 to move away from the second end 82 of the first beam 11B and causes the second end 84 of the second beam 12B to move away from the second end 82 of the first beam 11B when the beam coupler 29 is coupled to or engaged to the second end 84 of the second beam 12B resulting in the first jaw 13B and the second jaw 14B being moved away from each other.

In preferred embodiments, the beams 11B, 12B, may be elongated in shape. Optionally, the beams 11A, 12A, may be complex curved in shape, such that the portion of the first beam 11B between the first end 81 and beam pivot 27 may be convex curved and the portion of the first beam 11B between the second end 82 and beam pivot 27 may be concave curved relative to each other while the portion of the second beam 12B between the first end 83 and beam pivot 27 may be concave curved and the portion of the second beam 12B between the second end 84 and beam pivot 27 may be convex curved relative to each other as perhaps best shown in FIGS. 2 and 3. Preferably, the beams 11B, 12B, may be elongated so that the distance between the first ends 81, 83, and second ends 82, 84, may form the largest dimensions of the beams 11B, 12B. The beams 11B, 12B, may be made from or may comprise aluminum, steel, other metals and metal alloys, or any other substantially rigid material. Optionally, the beams 11B, 12B, may be configured with an elongated rectangular prism shape, but it should be understood that the beams 11B, 12B, may be configured in any shape and size.

The device 100B may comprise one or more adjustable couplings 15. In preferred embodiments, an adjustable coupling 15 may comprise threaded rods, threaded bolts, screws, or other threaded fastener or threaded coupling method having threading 33. A beam pivot 27 may movably couple the first beam 11B and the second 12B beam together so that the first beam 11B and the second beam 12B are able to pivot relative to each other and so that the first ends 81, 83, of the beams 11B, 12B, may be moved towards and away from each other. Preferably, a beam pivot 27 may comprise a pivot pin, rivet, or other pivotal coupling, and the adjustable coupling 15 may comprise a threaded rod.

A beam coupler 29 may be configured in any shape and size. For example, a beam coupler 29 may be generally cylindrical in shape, rectangular prism in shape, etc. A beam coupler 29 may be configured to be removably coupled or removably engaged to the second end 84 of the second beam 12B so that movement of the beam coupler 29 along the adjustable coupling 15 may be transferred to the second end 84 of the second beam 12B. In preferred embodiments, a beam coupler 29 may comprise a coupler cavity 38. The coupler cavity 38 may be sized and shaped to receive a portion of the second end 84 of the second beam 12B, and the beam coupler 29 may be removably coupled or removably engaged to the second end 84 of the second beam 12B by positioning the second end 84 of the second beam 12B within the coupler cavity 29. Preferably, the second beam 12B may comprise a beam stop that 30 is configured to limit the positioning of the second end 84 of the second beam 12B within the coupler cavity 38, such as to prevent over insertion and or to let the user know that the second end 84 of the second beam 12B is not fully positioned within the coupler cavity 38. A beam stop 30 may comprise a protrusion, ridge, fastener or other object that is sized to be larger than the coupler cavity 38 so that all or portions of the beam stop 30 may not fit into the coupler cavity 38.

Once the beam coupler 29 is removably coupled or removably engaged to the second end 84 of the second beam 12B, moving the beam coupler 29 towards the second end 82 of the first beam 11B may move the second end 84 of the second beam 12B towards the second end 82 of the first beam 11B and therefore move the first end 83 of the second beam 12B and the second jaw 14A away from the first jaw 13B. Once the beam coupler 29 is removably coupled or removably engaged to the second end 84 of the second beam 12B, moving the beam coupler 29 away from the second end 82 of the first beam 11B may move the second end 84 of the second beam 12B away from the second end 82 of the first beam 11B, and therefore move the first end 83 of the second beam 12B and the second jaw 14A towards the first jaw 13B.

A beam coupler 29 may be movably coupled to the adjustable coupling 15, such as via threading 33 that may engage with a pivotal coupling 25 on the beam coupler 29, so that the beam coupler 29 may be moved between the two ends of the first adjustable coupling 15. Preferably, the device 100B may comprise one or more pivotal couplings 25 which may be used to movably and pivotally couple an adjustable coupling 15 to the beam coupler 29. In some embodiments, a pivotal coupling 25 may comprise threading to engage with threading 33 of an adjustable coupling 15 and the pivotal coupling 25 may be movably coupled to the beam coupler 29 to prevent the adjustable coupling 15 from being bent as the beams 11B, 12B, are moved to different positions relative to each other and to the beam coupler 29. Generally, the pivotal coupling 25 movably couples the beam coupler 29 to the adjustable coupling 15 so that the beam coupler 29 is able to pivot relative to the adjustable coupling 15. As an example, a pivotal coupling 25 may comprise a barrel nut (also known as steel cross dowel or dowel nut). A pivotal coupling 25 that comprises a barrel nut sits in a hole inside the beam coupler 29 that the pivotal coupling 25, 26, may pivot in, and a standard bolt or other adjustable coupling 15 is threaded into the barrel nut from outside the beam coupler 29. In other embodiments, a pivotal coupling 25 may comprise any other fastener or coupling method that may be movably and pivotally coupled to a beam coupler 29 and that may be movably and rotatably coupled to an adjustable coupling 15.

In some embodiments, an adjustable coupling motivator 17 may be coupled to the adjustable coupling 15. In some embodiments, an adjustable coupling motivator 17 may be movably coupled to the adjustable coupling 15 so that the end of the adjustable coupling motivator 17 that is distal to the adjustable coupling 15 may be pivoted towards and away from the adjustable coupling 15. For example, the device 100B may have a motivator pivot 39 that may comprise a pivot pin, rivet, other fastener, or other movable coupling that may movably couple the adjustable coupling motivator 17 to the adjustable coupling 15.

In preferred embodiments, an adjustable coupling motivator 17 may comprise a handle or rigid length of material that may be pivotally or movably coupled to the adjustable coupling 15. Other example adjustable coupling motivators 17 include a ratchet, electric motors having independent controls, and a socket that may be coupled to a drill or other rotary tool. Preferably, by moving or rotating the adjustable coupling motivator 17, the adjustable coupling 15 may likewise be moved or rotated which in turn causes the beam coupler 29 to move an engaged or coupled second end 84 of the second beam 12B either towards or away from the second end 82 of the first beam 11B. For example, rotating an adjustable coupling motivator 17 in a first direction may result in the first ends 81, 83, of the beams 11B, 12B, proximate to the jaws 13B, 14B, to be moved closer together, while rotating the adjustable coupling motivator 17 in a second direction may result in the first ends 81, 83, of the beams 11B, 12B, proximate to the jaws 13B, 14B, to be moved farther apart.

A coupling fastener 28 may movably couple the first adjustable coupling 15 to the second end 82 of the first beam 11B, and the coupling fastener 28 may enable the end of the first adjustable coupling 15 that is distal to the second end 82 of the first beam 11B to be moved or pivoted towards and away from the beams 11B, 12B. A coupling fastener 28 may comprise a pivot pin, rivet, other fastener, or other movably coupling method which may enable the end of the first adjustable coupling 15 that is distal to the second end 82 of the first beam 11B to be moved or pivoted towards and away from the beams 11B, 12B. When not in use, the beam coupler 29 may be moved away from contact with the second beam 12B and the adjustable coupling 15 may be pivoted up under the first beam 11B so that the coupling fastener 28 and pivotal coupling 25 may enable the beam coupler 29 and the adjustable coupling 15 to be folded up under the first beam 11B and out of the way so that a user may move the beams 11B, 12B, manually. In preferred embodiments, coupling fastener 28 may movably couple the first adjustable coupling 15 to the second end 11B of the first beam 11B, so that the first adjustable coupling 15 may swivel and rotate while being coupled to the first beam 11B so that the coupling fastener 28 allows the first adjustable coupling 15 to be pivotally and rotatably coupled to the first beam 11B. In this manner, the coupling fastener 28 allows the first adjustable coupling 15 to be constrained yet rotated. As an example, a coupling fastener 28 may comprise a swivel having one end pinned to the first beam 11B via a pivot pin, while the other end of the swivel type coupling fastener 28 may be coupled to the first adjustable coupling 15 so that the coupling fastener 28 may enable the adjustable coupling 15 to be both pivoted and rotated relative to the first beam 11B.

As perhaps best shown in FIGS. 2 and 3, the jaws 13B, 14B, may comprise grip texturing 21A, 21B, 22A, 22B, on the inside surfaces and outside surfaces which may enable the jaws 13B, 14B, to grip interior surfaces and exterior surfaces of objects. In some embodiments, the first jaw 13B may comprise a first inner grip texturing 21A, the second jaw 14B may comprise a second inner grip texturing 21B, and the first inner grip texturing 21A may face towards the second inner grip texturing 21B. In some embodiments, the first jaw 13B may comprise a first outer grip texturing 22A, the second jaw 14B may comprise a second outer grip texturing 22B, the first outer grip texturing 22A and the first inner grip texturing 21A may be disposed on opposite sides of the first jaw 13B, and the second outer grip texturing 22B and the second inner grip texturing 21B may be disposed on opposite sides of the second jaw 14B so that the first outer grip texturing 22A and second outer grip texturing 22B face away from each other. The beam coupler 29 also allows the jaws 13B, 14B, to be securely locked closed and can be easily released by applying a reverse rotation movement to the adjustable coupling 15 and/or adjustable coupling motivator 17. Additionally, the device 100B now has the capability to expand permitting grip texturing 21A, 21B, 22A, 22B, on both sides of the jaws 13B, 14B, for example to enable the device 100B to alternatively grip the inside or outside of a pipe.

In preferred embodiments, the device 100B may comprise a plurality of different types of jaws 13B, 14B, which may be removably and interchangeably coupled to the first ends 81, 83, of beams 11B, 12B. Different types of jaws 13B, 14B, may come in various forms, including needle nose, straight, curved, padded, cutting, and bending. Depending on the type of jaws 13B, 14B, coupled to the beams 11B, 12B, the device 100B may possess different types of functions, such as the capability of gripping, bending, or cutting objects internally or externally. Jaws 13B, 14B, may be removably coupled to a beam 11B, 12B, via one or more jaw fasteners 19, 20, such as bolts, screws, and other threaded fasteners, by being threadedly coupled to the beams 11B, 12B, or via any other removable coupling method or device.

Figure 4:
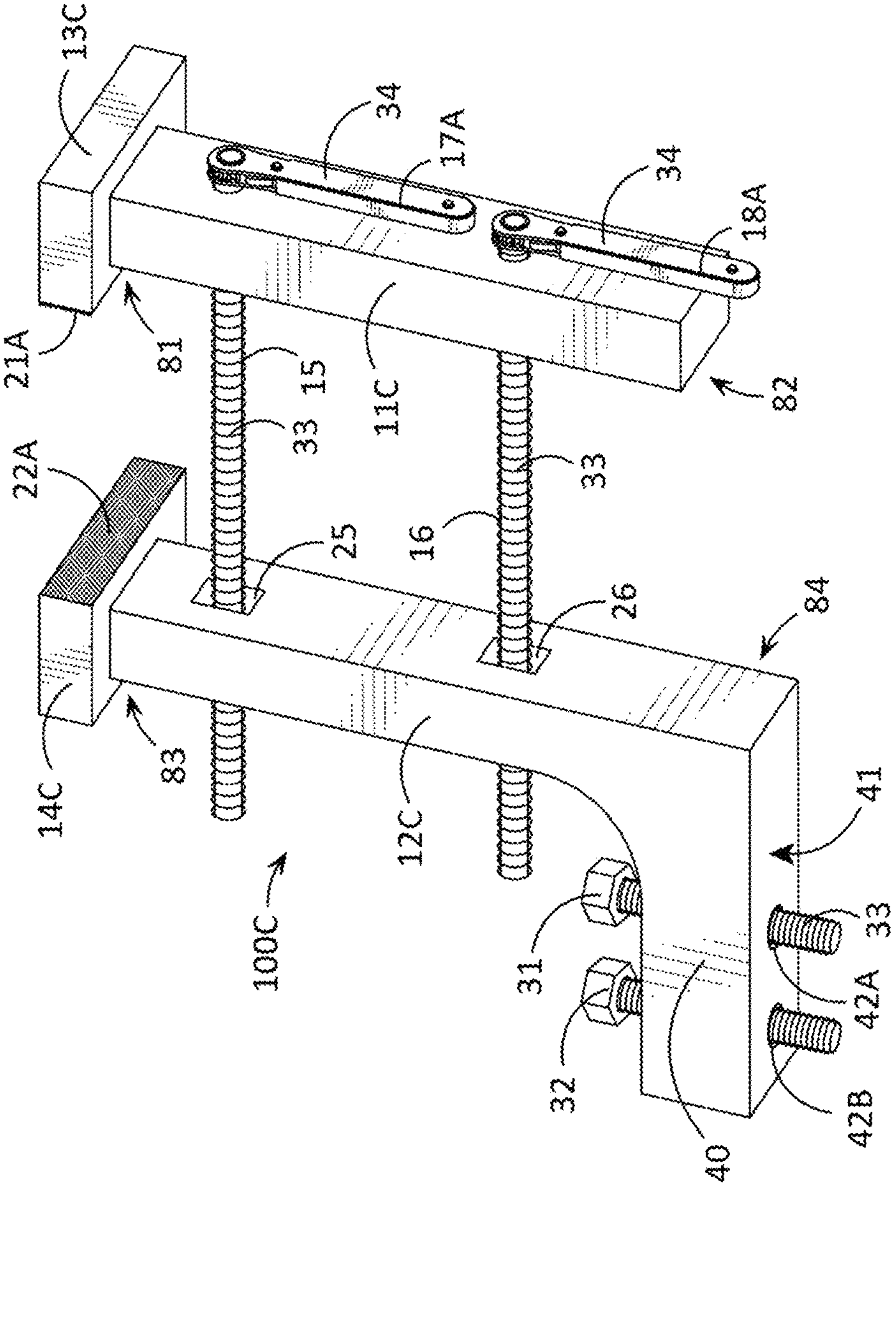
FIG. 4—FIG. 4 depicts a perspective view of a third example of a lock jaw tool device according to various embodiments described herein.

Turning now to FIG. 4, a third example of a device 100C is illustrated. This embodiment of the device 100C has the ability to be used as a bench-mounted vise, offering advantages over conventional horizontal single-screw vises due to the fulcrum on the screws' pivot. In this and in some embodiments, the device 100C may comprise a first beam 11C and a second beam 12C that may be movably coupled together in two locations on each beam 11C, 12C, via a first adjustable coupling 15 and a second adjustable coupling 16. A first jaw 13C may be coupled to a first end 81 of the first beam 11C, and a second jaw 14C may be coupled to a first end 83 of the second beam 12C. The adjustable couplings 15, 16, may couple the beams 11C, 12C, together and may govern the positioning of the beams 11C, 12C, relative to each other. This embodiment of the device 100C enables the jaws 13C, 14C, to generate greater force, such a greater clamping force, than existing vices. After rotating the top or first adjustable coupling 15 in a first direction, such as clockwise, to clamp the jaws 13C, 14C, onto the item being clamped between the jaws 13C, 14C, the lower or second adjustable coupling 16 can be rotated in a second direction, such as anti-clockwise, resulting in an increase at the pivot of the first adjustable coupling 15 by leveraging the distance from the second adjustable coupling 16 to the jaws 13C, 14C.

In some embodiments, the device 100C may comprise a first beam 11C having a first end 81 and a second end 82, and a second beam 12C also having a first end 83 and a second end 84. A base 40 may be coupled to the second end 84 of the second beam 12C, and the base 40 may have a planar mounting surface 41 and a mounting aperture 42 extending through the base 40 and through the planar mounting surface 41. A first adjustable coupling 15 may couple the first beam 11C and the second beam 12C together proximate to the first end 81 of the first beam 11C and proximate to the first end 83 of the second beam 12C. A second adjustable coupling 16 may couple the first beam 11C and the second beam 12C together proximate to the second end 82 of the first beam 11C and proximate to the second end 84 of the second beam 12C. A first jaw 13C may be coupled to the first end 81 of the first beam 11C, and a second jaw 14C may be coupled to the first end 83 of the second beam 12C. Rotating the first adjustable coupling 15 in a first direction, such as clockwise, causes the first beam 11C and the second beam 12C to be moved relative to each other causing the first jaw 13C and the second jaw 14C to be moved towards each other. Rotating the first adjustable coupling 15 in a second direction, the second direction opposite to the first direction, such as anticlockwise, causes the first beam 11C and the second beam 12C to be moved relative to each other causing the first jaw 13C and the second jaw 14C to be moved away from each other. Rotating the second adjustable coupling 16 in the first direction causes the first beam 11C and the second beam 12C to be moved relative to each other causing the first jaw 13C and the second jaw 14C to be moved away from each other. Rotating the second adjustable coupling 16 in the second direction causes the first beam 11C and the second beam 12C to be moved relative to each other causing the first jaw 13C and the second jaw 14C to be moved towards each other.

Preferably, the device 100C may comprise one or more pivotal couplings 25, 26, which may be used to movably and pivotally couple an adjustable coupling 15, 16, to a beam 11C, 12C. In some embodiments, a pivotal coupling 25, 26, may comprise threading to engage with threading 33 of an adjustable coupling 15, 16, and the pivotal coupling 25, 26, may be movably coupled to a beam 11C, 12C, so that the pivotal coupling 25, 26, may pivot relative to the beam 11C, 12C, to prevent the adjustable coupling 15, 16, from being bent as the beams 11C, 12C, are moved to different positions relative to each other and to the adjustable couplings 15, 16. As an example, a pivotal coupling 25, 26, may comprise a barrel nut (also known as steel cross dowel or dowel nut). A barrel nut is typically a round slug, or formed metal part with threads perpendicular to the length of the nut. A pivotal coupling 25, 26, that comprises a barrel nut sits in a hole inside a beam 11C, 12C, that the pivotal coupling 25, 26, may pivot in, and a standard bolt or other adjustable coupling 15, 16, is threaded into the barrel nut from outside the beam 11C, 12C. In other embodiments, a pivotal coupling 25, 26, may comprise any other fastener or coupling method that may be movably and pivotally coupled to a beam 11C, 12C, and that may be movably and rotatably coupled to an adjustable coupling 15, 16.

In preferred embodiments, each adjustable coupling 15, 16, may be coupled to a beam 11C, 12C, via a pivotal coupling 25, 26, for example, the device 100C may have four pivotal couplings 25, 26. In further preferred embodiments, the device 100C may have a first pivotal coupling 25, and the first pivotal coupling 25 may movably couple the second beam 12C to the first adjustable coupling 15 so that the second beam 12C is able to pivot relative to the first adjustable coupling 15. In further preferred embodiments, the device 100C may have a second pivotal coupling 26, and the second pivotal coupling 26 may movably couple the second beam 12C to the second adjustable coupling 16 so that the second beam 12C is able to pivot relative to the second adjustable coupling 16.

In some embodiments, a first adjustable coupling motivator 17A may be coupled to the first adjustable coupling 15 and a second adjustable coupling motivator 18A may be coupled to the second adjustable coupling 15. In preferred embodiments, an adjustable coupling motivator 17A, 18A, may comprise a ratchet 34. A ratchet 34 is a mechanical device that allows continuous linear or rotary motion in only one direction while preventing motion in the opposite direction. For example, a ratchet 34 may comprise a device having a bar or wheel with a set of angled teeth in which a cog or tooth engages, allowing motion in one direction at a time only. Other example adjustable couplings 17A, 18A, include a handle, electric motors having independent controls, and a socket that may be coupled to a drill or other rotary tool. Preferably, by moving or rotating the adjustable coupling motivators 17A, 18A, the adjustable couplings 15, 16, may likewise be moved or rotated which in turn causes the beams 11C, 12C, to be moved relative to each other. For example, rotating a first adjustable coupling motivator 17A in a first direction may result in the first ends 81, 83, of the beams 11C, 12C, that are proximate to the jaws 13C, 14C, to be moved closer together, while rotating the first adjustable coupling motivator 17A in a second direction, the second direction opposite to the first direction, may result in first ends 81, 83, of the beams 11C, 12C, that are proximate to the jaws 13C, 14C, to be moved farther apart.

The adjustable couplings 15, 16, enable the formation of two fulcrums for the purpose of generating pressure on an object that is positioned between the jaws 13C, 14C. Preferably, the jaws 13C, 14C, may comprise grip texturing 21A, 22A, such as ridges or teeth, cutouts or depressions, etc., which may facilitate the ability of the device 100C to grip an object between the grip texturing 21A, 22A. In some embodiments, the first jaw 13B may comprise a first inner grip texturing 21A, the second jaw 14B may comprise a second inner grip texturing 21B, and the first inner grip texturing 21A may face towards the second inner grip texturing 21B. Through independent control of each adjustable coupling 15, 16, the jaws 13C, 14C, of the beams 11C, 12C, can, preferably via grip texturing 21A, 22A, firmly grip or otherwise manipulate material and objects using the jaws 13C, 14C, at varying angles.

In some embodiments, the device 100C may comprise or may be configured to receive one or more structure fasteners 31, 32, which may be used to couple the device 100C to objects, such as a bench, table, stand, etc. Structure fasteners 31, 32, may comprise screws, bolts, or any other fastener or fastening method which may be used to couple the device 100C to an object. In preferred embodiments, a base 40 may be coupled to the second end 84 of the second beam 12C, and the base 40 may have a planar mounting surface 41 and one or more mounting apertures 42A, 42B, may extend through the base 40 and through the planar mounting surface 41. The mounting apertures 42A, 42B, may be sized and shaped to enable a structure fastener 31, 32, to be inserted through and disposed in the mounting apertures 42A, 42B. The mounting apertures 42A, 42B, and structure fasteners 31, 32, may be used to couple a planar mounting surface 41 of the base 40 to another object that may be used to support the device 100C, such as a bench, table, stand, etc.

While some exemplary shapes and sizes have been provided for elements of the device 100A, 100B, 100C, it should be understood to one of ordinary skill in the art that the beams 11A, 11B, 11C, 12A, 12B, 12C, jaws 13A, 13B, 13C, 14A, 14B, 14C, adjustable couplings 15, 16, and any other element described herein may be configured in a plurality of sizes and shapes including "T" shaped, "X" shaped, square shaped, rectangular shaped, cylinder shaped, cuboid shaped, hexagonal prism shaped, triangular prism shaped, or any other geometric or non-geometric shape, including combinations of shapes. It is not intended herein to mention all the possible alternatives, equivalent forms or ramifications of the invention. It is understood that the terms and proposed shapes used herein are merely descriptive, rather than limiting, and that various changes, such as to size and shape, may be made without departing from the spirit or scope of the invention.

Additionally, while some materials have been provided, in other embodiments, the elements that comprise the device 100A, 100B, 100C may be made from or may comprise durable materials such as aluminum, steel, other metals and metal alloys, wood, hard rubbers, hard plastics, fiber reinforced plastics, carbon fiber, fiberglass, resins, polymers or any other suitable materials including combinations of materials. Additionally, one or more elements may be made from or may comprise durable and slightly flexible materials such as soft plastics, silicone, soft rubbers, or any other suitable materials including combinations of materials. In some embodiments, one or more of the elements that comprise the device 100A, 100B, 100C may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the device 100A, 100B, 100C may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, a slide-to-lock type connection method or any other suitable temporary connection method as one reasonably skilled in the art could envision to serve the same function. In further embodiments, one or more of the elements that comprise the device 100A, 100B, 100C may be coupled by being one of connected to and integrally formed with another element of the device 100A, 100B, 100C.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A lock jaw tool device, the device including:

a first beam having a first end and a second end;

a second beam having a first end and a second end;

a beam pivot, wherein the beam pivot movably couples the first beam and the second beam together so that the first beam and the second beam are able to pivot relative to each other, wherein the beam pivot is coupled to the first beam between the first end of the first beam and between the second end of the first beam, and wherein the beam pivot is coupled to the second beam between the first end of the second beam and between the second end of the second beam;

an adjustable coupling, wherein the adjustable coupling is coupled to the first beam proximate to the second end of the first beam;

a coupling fastener, wherein the coupling fastener movably couples the first beam to the adjustable coupling so that the adjustable coupling is able to pivot relative to the first beam;

a beam coupler movably coupled to the adjustable coupling so that the beam coupler is able to be moved towards and away from the second end of the first beam, wherein the beam coupler comprises a cavity, wherein the second end of the second beam is configured to be inserted into the cavity;

a first pivotal coupling, wherein the first pivotal coupling movably couples the beam coupler to the adjustable coupling so that the beam coupler is able to pivot relative to the adjustable coupling and drive the second beam position relative to the first beam;

a first jaw coupled to the first end of the first beam; and a second jaw coupled to the first end of the second beam, wherein rotating the adjustable coupling in a first direction causes the beam coupler to move towards the second end of the first beam and causes the second end of the second beam to move towards the second end of the first beam when the beam coupler is coupled to the second end of the second beam resulting in the first jaw and the second jaw being moved towards each other, and wherein rotating the adjustable coupling in a second direction, the second direction opposite to the first direction, causes the beam coupler to move away from the second end of the first beam and causes the second end of the second beam to move away from the second end of the first beam when the beam coupler is coupled to the second end of the second beam resulting in the first jaw and the second jaw being moved away from each other.

2. The device of claim 1, wherein the beam coupler is removably coupled to the second end of the second beam by positioning the second end of the second beam within the coupler cavity.

3. The device of claim 2, wherein the second beam comprises a beam stop that is sized larger than the coupler cavity and that is configured to limit the positioning of the second end of the second beam within the coupler cavity.

4. The device of claim 1, further comprising an adjustable coupling motivator coupled to the adjustable coupling.

5. The device of claim 4, wherein the adjustable coupling motivator is movably coupled to the adjustable coupling.

6. The device of claim 1, wherein the first jaw comprises a first inner grip texturing, wherein the second jaw comprises a second inner grip texturing, and wherein the first inner grip texturing faces towards the second inner grip texturing.

7. The device of claim 6, wherein the first jaw comprises a first outer grip texturing, wherein the second jaw comprises a second outer grip texturing, wherein the first outer grip texturing and the first inner grip texturing are disposed on opposite sides of the first jaw, and wherein the second outer grip texturing and the second inner grip texturing are disposed on opposite sides of the second jaw.

8. The device of claim 4, wherein the adjustable coupling motivator comprises threading, and wherein the adjustable coupling motivator comprises an elongated handle.

* * * * *